United States Patent
Chowanski et al.

(10) Patent No.: US 12,549,367 B2
(45) Date of Patent: Feb. 10, 2026

(54) SYSTEMS AND METHODS FOR TOKENIZATION

(71) Applicant: The Toronto-Dominion Bank, Toronto (CA)

(72) Inventors: Wojciech Chowanski, Toronto (CA); Méliné N. Nikoghossian, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 236 days.

(21) Appl. No.: 18/353,763

(22) Filed: Jul. 17, 2023

(65) Prior Publication Data

US 2025/0030547 A1    Jan. 23, 2025

(51) Int. Cl.
 *H04L 29/06* (2006.01)
 *H04L 9/32* (2006.01)

(52) U.S. Cl.
 CPC .......... *H04L 9/3213* (2013.01); *H04L 9/3297* (2013.01)

(58) Field of Classification Search
 None
 See application file for complete search history.

(56) References Cited

U.S. PATENT DOCUMENTS

| | | | |
|---|---|---|---|
| 10,135,763 B2 | 11/2018 | Sheth | |
| 10,817,621 B2 | 10/2020 | Takahashi | |
| 10,878,126 B1 * | 12/2020 | Koduru | G06F 16/211 |
| 11,074,238 B2 | 7/2021 | Kessler | |
| 11,093,476 B1 | 8/2021 | Neeman | |
| 11,171,930 B2 | 11/2021 | Baig | |
| 11,449,627 B2 | 9/2022 | Bayon | |
| 11,507,692 B2 | 11/2022 | Vemula | |
| 11,520,925 B1 | 12/2022 | Sumner | |
| 11,521,207 B2 | 12/2022 | Braundmeier | |

(Continued)

FOREIGN PATENT DOCUMENTS

| | | | | |
|---|---|---|---|---|
| JP | 4987203 B2 * | 7/2012 | ............. | G10L 15/30 |
| WO | WO-03098465 A1 * | 11/2003 | ......... | G06F 16/2264 |

(Continued)

OTHER PUBLICATIONS

Office Action (Non-Final Rejection) dated Mar. 24, 2025 for U.S. Appl. No. 18/353,526 (pp. 1-11).

(Continued)

*Primary Examiner* — Jeffery L Williams
(74) *Attorney, Agent, or Firm* — Marks & Clerk; Paul Horbal (57) ABSTRACT

Computer-implemented systems and methods for tokenization. The system includes a network, at least one token database coupled to the network, and a real-time tokenization server coupled to the at least one token database via the network. The server is configured to receive a request in real-time, determine one or more payload to be tokenized, and transmit the one or more payload to the at least one token database for tokenization. The at least one token database is configured to tokenize the one or more payload to generate one or more tokens and store an association between each of the one or more payload and respective one or more tokens along with a timestamp. The real-time tokenization server is further configured to receive at least one token from the token database and return the at least one token in response to the request.

17 Claims, 4 Drawing Sheets

(56) References Cited

U.S. PATENT DOCUMENTS

| | | | |
|---|---|---|---|
| 11,537,737 B2 | 12/2022 | Koduru | |
| 11,651,380 B1 | 5/2023 | Arnab | |
| 11,757,837 B2 | 9/2023 | Sofer | |
| 12,164,542 B1 | 12/2024 | Rahman | |
| 2003/0217033 A1* | 11/2003 | Sandler | G06F 16/2272 |
| 2014/0304825 A1* | 10/2014 | Gianniotis | H04L 63/0407 |
| | | | 726/26 |
| 2017/0104756 A1* | 4/2017 | Rosenthal | H04L 63/20 |
| 2018/0211055 A1 | 7/2018 | Balijepalli | |
| 2020/0117680 A1* | 4/2020 | Bapat | G06F 9/546 |
| 2022/0012241 A1* | 1/2022 | Colcord | G06F 16/24573 |
| 2022/0067184 A1* | 3/2022 | Lindsay | G06F 40/166 |
| 2022/0067205 A1* | 3/2022 | Lindsay | G06F 40/284 |
| 2022/0067206 A1* | 3/2022 | Lindsay | G06F 21/6209 |
| 2022/0067207 A1* | 3/2022 | Lindsay | G06F 21/6254 |
| 2022/0075878 A1* | 3/2022 | Begg | H04L 9/008 |
| 2022/0140997 A1* | 5/2022 | Lam | H04L 9/008 |
| | | | 713/168 |
| 2022/0164474 A1 | 5/2022 | Netke | |
| 2022/0366064 A1 | 11/2022 | Nikoghossian | |
| 2023/0140723 A1* | 5/2023 | Balasubramanian | G06Q 30/02 |
| | | | 726/26 |
| 2023/0143636 A1* | 5/2023 | Busjaeger | G06F 16/24552 |
| | | | 707/625 |
| 2023/0342481 A1* | 10/2023 | Nikoghossian | G06F 21/62 |
| 2024/0070306 A1 | 2/2024 | Jurat | |
| 2024/0143839 A1* | 5/2024 | Lindsay | G06F 16/93 |
| 2024/0184923 A1* | 6/2024 | Lindsay | G06F 21/6254 |
| 2024/0394684 A1* | 11/2024 | Sarin | G06Q 20/3672 |
| 2025/0028852 A1* | 1/2025 | Chowanski | G06F 21/6227 |
| 2025/0030547 A1* | 1/2025 | Chowanski | H04L 9/3213 |
| 2025/0045274 A1* | 2/2025 | Cseri | G06F 16/2379 |
| 2025/0068646 A1 | 2/2025 | Rahman | |

FOREIGN PATENT DOCUMENTS

| | | | | |
|---|---|---|---|---|
| WO | 2024148028 A1 | 7/2024 | | |
| WO | WO-2025094194 A1 * | 5/2025 | | H04L 63/0428 |

OTHER PUBLICATIONS

Office Action (Notice of Allowance and Fee(s) Due) mailed Dec. 30, 2025 in U.S. Appl. No. 18/353,526 (11 pages).

* cited by examiner

SYSTEMS AND METHODS FOR TOKENIZATION

TECHNICAL FIELD

The disclosed exemplary embodiments relate to computer-implemented systems and methods for processing data and, in particular, to systems and methods for tokenization.

BACKGROUND

Within a computing environment, there may exist databases or data stores that contain sensitive information (e.g., personally identifiable information or "PII") that is required to be kept confidential. It may be desirable or even necessary to maintain sensitive information within a computing environment that is physically controlled by a steward of the sensitive information. For example, the sensitive information may be stored in secure databases or private clouds within a data center owned and operated by the steward. These may be referred to "on-premises" systems.

Regarding the sensitive information, often it is not the entire record that is sensitive, but merely an element of the record. For example, an identifier number may be considered sensitive, while an identifier type may not.

In many cases, it may be desirable to use the data in the data store, or portions thereof, for additional purposes, or to reveal portions of the data to certain systems or entities that are not on-premises. For instance, the data may be used to train or test machine learning models that are executed in public clouds, such as Microsoft Azure™. In such cases, to protect any sensitive information in the data, obfuscation or masking can be employed to conceal or remove the sensitive information, such that it cannot be identified in the data to be used.

SUMMARY

The following summary is intended to introduce the reader to various aspects of the detailed description, but not to define or delimit any invention.

In at least one broad aspect, there is provided a tokenization system, the system comprising: a network; at least one token database coupled to the network; a real-time tokenization server coupled to the at least one token database via the network, the real-time tokenization server configured to: receive a request in real-time; in real-time, determine one or more payload to be tokenized and transmit one or more payload to the at least one token database for tokenization; the at least one token database configured to: tokenize the one or more payload to generate one or more tokens, and store an association between each of the one or more payload and respective one or more tokens along with a timestamp; the real-time tokenization server further configured to: receive at least one token from the at least one token database; and return the at least one token in response to the request.

In some cases, the tokenization system may further comprise: a batch tokenization server coupled to the at least one token database via the network, the batch tokenization server having a token table, the batch tokenization server configured to: receive at least one batch request response comprising a delta table; in response to each of the at least one batch request response, retrieve a plurality of recent tokens, based on a time of last update of the token table, from the at least one token database and update the token table with the plurality of recent tokens; using the token table, determine a new payload from the one or more payload to be tokenized; generate a new token corresponding to the new payload; and update the token table and the at least one token database with the new token.

In some cases, wherein the one or more payload may be used a key.

In some cases, the one or more payload may be preprocessed to generate the key.

In some cases, the one or more payload may be truncated based on a set of predetermined rules and wherein the set of predetermined rules includes at least identifying a particular portion of the one or more payload to be used as the key.

In some cases, the real-time tokenization server may be a microservice.

In some cases, the at least one token database may be a SQL database.

In some cases, the token table may be stored in a local database of the batch tokenization server, the local database distinct from the at least one token database.

In another broad aspect, there is provided a method comprising: receiving, by a real-time tokenization server, a request; determining, in real-time by the real-time tokenization server, one or more payload to be tokenized; transmitting, by the real-time tokenization server, the one or more payload to at least one token database for tokenization; receiving, by the real-time tokenization server, at least one token from the at least one token database; and returning, by the real-time tokenization server, the at least one token in response to the request.

In some cases, the method may further comprise retrieving, in response to at least one batch request response, by a batch tokenizer server, a plurality of recent tokens, based on a time of last update of the token table, from the at least one token database and updates the token table with the plurality of recent tokens; determining a new payload from the one or more payload to be tokenized, using the token table; generating a new token corresponding to the new payload; and updating the token table and the at least one token database with the new token.

In some cases, the method may further comprise using the one or more payload as a key.

In some cases, the method may further comprise preprocessing the one or more payload to generate the key.

In some cases, the method may further comprise truncating the one or more payload based on a set of predetermined rules and wherein the set of predetermined rules includes at least identifying a particular portion of the one or more payload to be used as the key.

In some cases, the real-time tokenization server may be a microservice.

In some cases, the at least one token database may be a SQL database. In some cases, the token table may be stored in a local database od the batch tokenization server, the local database distinct from the at least one token database.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields, and compositions. A sufficiently large organization may have hundreds of millions of records across these various databases, corresponding to tens of thousands, hundreds of thousands or even millions of customers.

Tokenization is one common approach for de-risking sensitive information. Tokenization involves substituting a sensitive data element with a non-sensitive equivalent, i.e. a token. Tokenization may be performed according to pre-specified rules, which may be stored in a configuration file. Each input payload is tokenized according to a standardized approach, and the resulting token is, or incorporates, a Universally Unique Identifier (UUID), such that any given sensitive data element is only tokenized once. The process of generating a UUID generally is not reproducible, therefore each payload-token mapping can be stored in a distributed key-value store, with the input payload serving as the basis for the key, either directly or after pre-processing- and the generated token stored as the value. Before generating a new token, the payload is first checked against the distributed key-value store to determine whether a corresponding token has been previously created.

Conventionally, in enterprise computing systems, this token generation has been performed in one of two ways. Typically, a batch tokenization process tokenizes data in large batches on a periodic basis, such as daily, weekly, or monthly, etc. In some cases, a real-time tokenization service may be available to tokenize data on demand. However, conventionally both the real-time and batch tokenization services have been located on-premises.

Some computer systems that are on-premises may have direct access to the tokenized database, however systems that are not on-premises may only have access to tokenized data received through periodic ingestion into a tokenized database in the public cloud. This results in delays and inefficiencies for off-premises systems, which must wait for new data to be tokenized and for newly-tokenized data to be ingested into the off-premises systems in a further batch process. Alternatively, the off-premises systems may need to obtain tokenized data from multiple sources, which introduces additional complexity and can lead to difficulties synchronizing data.

For example, with the conventional approach, if an on-premises system requires new tokens to be generated, perhaps even in real-time, the tokens may be generated and stored in an on-premises token database by an on-premises tokenization system. However, an off-premises system, such as a machine learning model that executes in a public cloud, will be unable to use newly-generated tokens until a scheduled ingestion process is completed at a predetermined, usually later, time. Alternatively, the off-premises system may need to be provisioned to access either the on-premises token database which introduces security challenges and complexity, the off-premises database which introduces delays, or both. Due to asymmetry in the computing resources between a private cloud and a public cloud, it may not be feasible or desirable to provide off-premises systems with real-time access to the on-premises token database. Even in cases where the off-premises system is able to access the on-premises token database, such access may be limited to receiving batch updates, rather than real-time updates.

Systems and methods are provided for a secure token database stored in a public cloud, together with a real-time tokenization application programming interface (API) endpoint accessible to systems within the public cloud or from within a secure private network, and a batch tokenization service for periodically ingesting and tokenizing data. The described embodiments also ensure that the real-time tokenization is coordinated with the batch tokenization, to maintain coherency in the token database.

Figure 1:
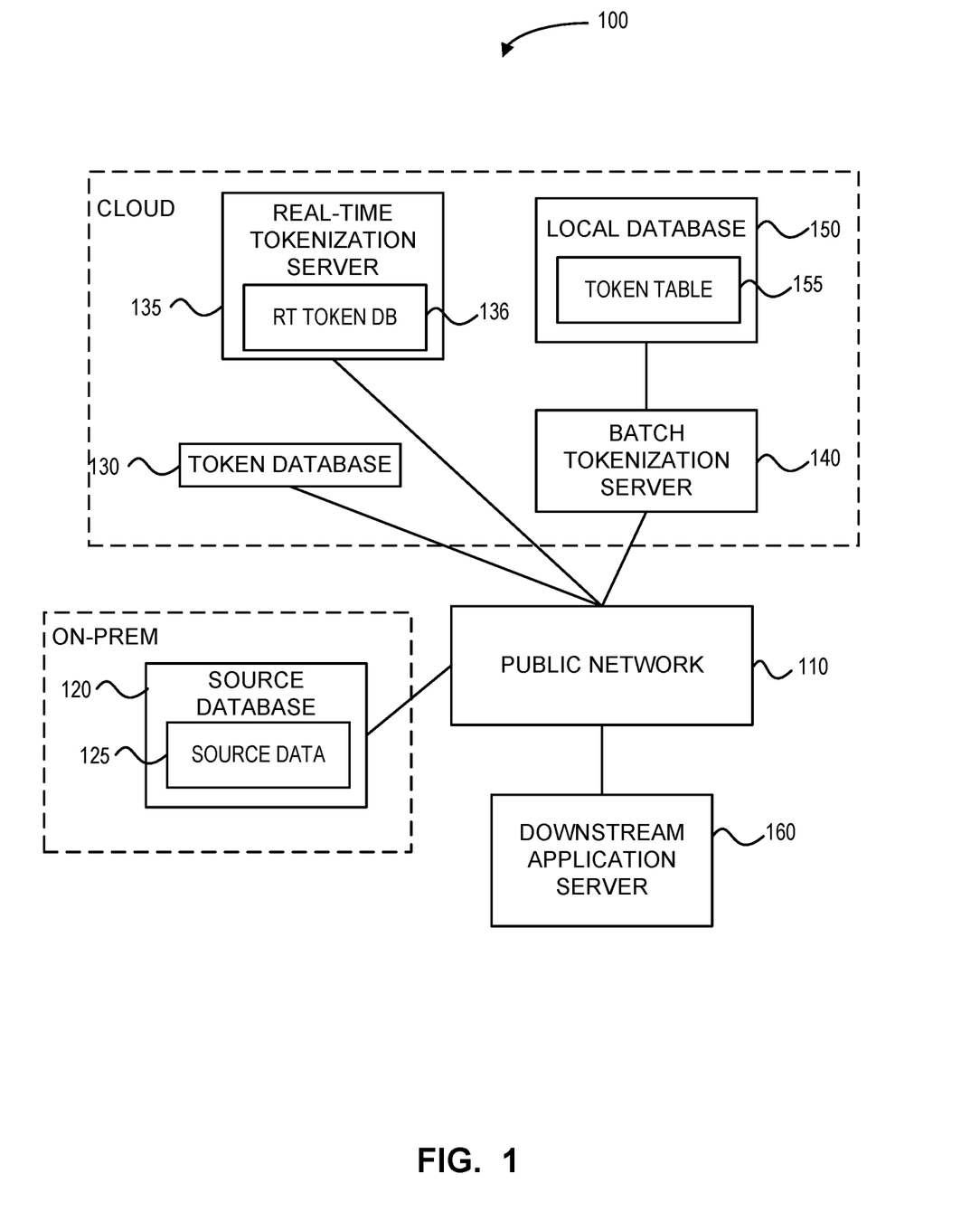
FIG. 1 is a schematic block diagram of an exemplary tokenization system in accordance with at least some embodiments.

Referring now to FIG. 1, there is illustrated a block diagram of an example computing system, in accordance with at least some embodiments. Computing system 100 includes a network 110 (which may include portions of a public network, such as the Internet), a source database 120 that provides source data 125, a token database 130, a real-time tokenization server 135 with a real-time token database 136, a batch tokenization server 140, a local database 150 containing a token table 155, and a downstream application server 160.

The source database 120, the token database 130, the real-time tokenization server 135, the batch tokenization server 140, and the downstream application server 160 are operatively coupled to the network. The batch tokenization server 140 has access to the local database 150 containing the token table 155. The real-time tokenization server 135 has access to the real-time token database 136. The source database 120 is located on-premises. The token database 130, the real-time tokenization server 135, the batch tokenization server 140, and the local database 150 are located in the cloud.

In some cases, the batch tokenization server 140 may receive batch tokenization requests from the source database 120, which provides source data 125 to the batch tokenization server 140. In some cases, source data 125 may be provided from other systems, processes, and equipment.

The token database 130 stores existing tokens generated through de-risking of sensitive source data 125 by the batch tokenization server 140 and the real-time tokenization server 135.

Both the batch tokenization server and the real-time tokenization server may have local databases used for temporarily storing tokens and/or key-value pairs. For example, the token table 155 of local database 150 is a local cached copy of key-value pairings of tokens stored in the token database 130. Since the token database 130 may be a SQL database hosted by a different server, for example, the token table 155 is stored locally (e.g., with access either via direct connection or via a low latency network link) to the batch tokenization server 140 to minimize latency particularly when performing batch ingestion, and is synchronized with the token database 130 either periodically or on-demand. Similarly, the real-time tokenization server 135 has a local real-time token database 136, which stores tokens and/or key-value pairs for newly-created tokens, until such time as the newly-created tokens are synchronized to the token database 130 (e.g., by batch tokenization server 140). For convenience, the source database 120, the token database 130, real-time token database 136 and the local database 150 are referred to herein as "databases" however it will be understood that each such database may be stored and provided by a database server, which is a computer server or servers configured to store and provide access to data using a database system. The source database 120 and the token database 130 may be cloud based databases, and may be SQL databases. The local database 150 may be a local database of the batch tokenization server 140, and may be distinct from the source database 120 and the token database 130.

The real-time tokenization server 135 offers a token API endpoint and may be a HTTP/HTTPS server or microservice such as an Apache Tomcat™ servlet, configured to respond to API requests received over HTTP or HTTPS. The real-time tokenization server 135 connects to the batch tokenization server 140 and to the token database 130 via the network 110 and is capable of generating new tokens and retrieving previously generated tokens from the token database 130.

The real-time tokenization server 135 receives real-time tokenization requests, which may be from the downstream application server 160 or from other systems, either on-premises or off-premises. The real-time tokenization server 135 receives the source data 125, determines if a token has already been created by the real-time tokenization server 135 (i.e., by querying the local real-time token database 136), and, if no token exists, determines and applies the specified de-risking, such as obfuscation, redaction, and tokenization, to create the token or tokens, and stores the token or tokens, in the real-time token database 136. Optionally, the real-time tokenization server 135 outputs the newly created token or tokens to the requesting system, such as the downstream application server 160.

As noted, when the real-time tokenization server 135 receives the real-time request, the real-time tokenization server 135 first accesses the real-time token database 136 to determine if there is an existing token for the payload or payloads in the request. The payload is used as the key when determining if there is an existing matching token in the real-time token database 136. If there is no existing token in the real-time token database 136, a new token is generated and stored in the real-time token database 136. The real-time token database 136 is a key-value store in which a payload may be used as a key and a corresponding token may be stored as the value. In some embodiments, the real-time token database 136 may be omitted and the real-time tokenization server 135 may communicate directly with the token database 130.

The real-time tokenization server 135 is accessible via API for real-time requests and is capable of supporting tens of thousands of requests per day, hundreds of token identities or tables each containing millions of token values, with tables of reaching into terabytes in size. The real-time tokenization server 135 can also support concurrent requests while ensuring a single tokenized value per key.

The described real-time tokenization server 135 can also provide detokenization. When a detokenization request is received, the real-time tokenization server 135 can retrieve the payload associated with the token in the tokenized data, either in the real-time token database 136 or token database 130, and can substitute each payload for a corresponding token to generate the detokenized data.

The batch tokenization server 140 periodically performs batch tokenization on a scheduled basis (which may be daily, weekly, monthly, etc.), tokenizes data, and updates the token database 130 with new tokens. The batch tokenization server 140 may also synchronize the real-time token database 136 with the token database 130 as part of one or more periodic updates. As the batch tokenization server 140 operates periodically based on the batch tokenization operations, the token database 130 may be updated with new tokens based on the real-time requests received by the real-time tokenization server 135 stored in the real-time token database 136 in between runs of the batch tokenization process. However, it may be too computationally expensive for the batch tokenization server 140 to query the token database 130 for every single token to be created during the batch tokenization process. The batch tokenization server 140 therefore stores a local copy of key-value pairs retrieved from the token database 130 (or generated locally during the batch tokenization process) in the token table 155 stored in the local database 150.

The batch tokenization server 140 can accommodate source data 125 that comes in from different schemas, attributes, and classifications. For example, some columns may be confidential or restricted, and there may be thousands of sources of the data, each with different classifications. The batch tokenization server 140 reads the source data 125, applies the appropriate de-risking, stores de-risking information in the token database 130, and outputs the tokenized data to the appropriate target system, such as the downstream application server 160.

The batch tokenization server 140 receives a batch request which may be received from the source database 120 via the network 110. The batch request from the source database 120 may be sent according to a set schedule to periodically tokenise new source data 125. In some cases, the batch request also may be driven by another system's requirement to execute with tokenized data, and therefore may be driven by the batch tokenization server 140, or may be an on-demand request.

The batch request may include a delta table for the source data 125 forming a payload or payloads to be tokenized. The batch tokenization server 140 first accesses the token database 130 to retrieve recent tokens and updates the token table 155 in the local database 150. The batch tokenization server 140 checks if the payload or payloads in the delta table have an existing corresponding entry in the token table 155. The token table 155 is a key-value store. For example, a payload may be used as a key and a corresponding token may be stored as the value. The batch tokenization server 140 checks for an existing entry in the token table 155 by using each payload in the delta table as a key. If the batch tokenization server 140 does not find an existing token corresponding to the payload in the token table 155, a new token is generated and returned and the token database 130 is updated accordingly. The batch tokenization server 140 then de-risks the payload, i.e., substitutes the token for the payload in the delta table, to create a tokenized delta table, which may be stored in a tokenized database and, in some cases, may be sent to the downstream application server 160.

The described batch tokenization server 140 can also provide detokenization. When detokenized data is required, the batch tokenization server 140 can retrieve the payload associated with the token value in the tokenized data, and can substitute each payload for a corresponding token to generate the detokenized data.

The payload may require pre-processing before it can be used as a key. For example, a payload may be truncated according to predetermined rules to facilitate use as a key. A rule may specify, for example, that only a particular portion of the payload is to be used or substituted. The payload may be normalized in some cases, such as by converting alphabetic characters to upper or lower case. Different configuration files may be provided for varying types of payloads. For example, there may be one configuration file for names, another for postal code data, another for identifier numbers, another for dates, etc. The configuration files generally specify any preprocessing of payloads that is to be performed and the rules for generating tokens.

The batch tokenization server 140 may be provided as a microservice that operates to process the incoming delta tables received periodically containing new data that may be generated on-premises. The incoming delta tables may also be retrieved periodically by the batch tokenization server 140 using structured query language (SQL). As source data 125 may be coming from multiple different sources at different times, and as there may be other processes in the wider network also generating tokenized data, it may be necessary to keep the token table 155 in sync with token tables generated by other concurrent processes. Accordingly, the batch tokenization server 140 may perform the following:

load the token table 155;
load the source data 125 delta table;
left anti join the delta table with the token table 155 to find rows that need new tokens;
generate new tokens and store them in the token database 130;
incrementally synchronize the token table 155 with the token database 130; and
generate tokenized data.

This approach assures that new tokens are created only in the token database 130, does not require full table loads from the token database 130 or a separate synchronization process, and that only one token is used for the same payload.

Similarly, as the real-time token database 136 may have been updated with new tokens as a result of real-time requests going through the real-time tokenization server 135, the batch tokenization server 140 may periodically synchronize the real-time token database 136 to the token database 130.

The downstream application server 160 may execute a machine learning model that performs actions such generating predictions or inferences for transactions or anticipated behaviour. The downstream application server 160 may execute the model on a pre-determined basis such as daily, weekly, or monthly and relies on up-to-date data to generate predictions or inferences that are as accurate as possible.

Machine learning models may be trained and used with tokenized data. Specifically, training may be conducted using data tokenized via batch tokenization or real-time tokenization, for example by the batch tokenization server 140 or the real-time tokenization server 135 respectively. Once the machine learning model is trained on tokenized data, input data to the trained model can also be tokenized, allowing the machine learning model to operate on "native" tokenized information. Once the output is generated, a requesting application can de-tokenize by substituting the original payload for display to a requesting application.

In one example of this approach, a machine learning system may be trained to predict a risk of a future event based on historical data. The historical data is exported from a source data set, such as the source data 125 from the source database 120, via the batch tokenization server 140 or the real-time tokenization server 135, with any PII (e.g., names, postal codes, etc.) tokenized in the process. The model is then trained on the tokenized historical data.

Other systems, such as the downstream application 160, may subscribe to events from the token database 130, the real-time tokenization server 135, or the batch tokenization server 140. The events may include, for example, updates to data, schema, or status, such as jobs completed or failed.

Figure 2:
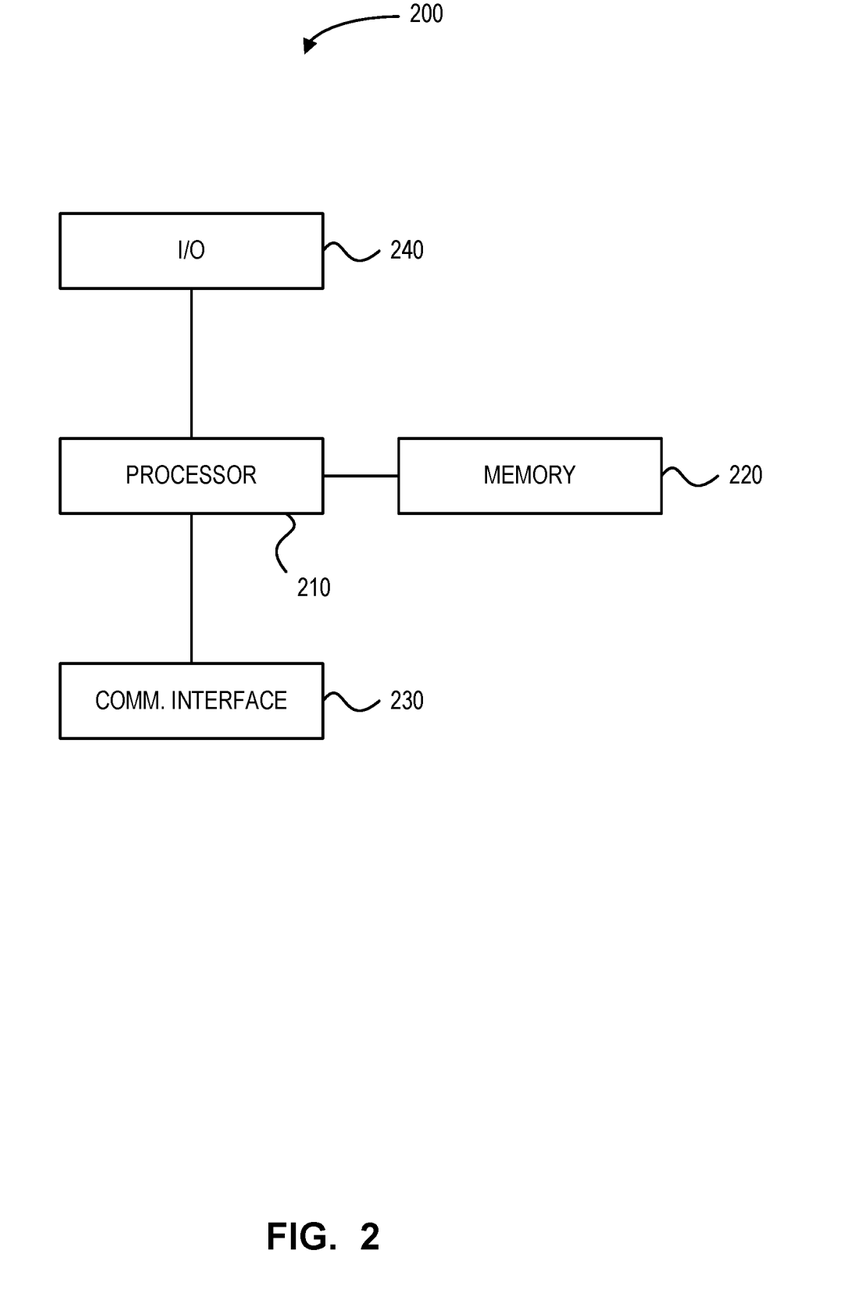
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as the source database 120, the token database 130, the real-time tokenization server 135, the batch tokenization server 140, the local database 150, and the downstream application server 160. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230 and may also transmit or receive data via any additional input/output device 240 as appropriate.

In some implementations, computer 200 may be a batch processing system that is generally designed and optimized to run a large volume of operations at once, and is typically used to perform high-volume, repetitive tasks that do not require real-time interactive input or output. The batch tokenization server 140 may be one such example. Conversely, some implementations of computer 200 may be interactive systems that accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks.

Figure 3:
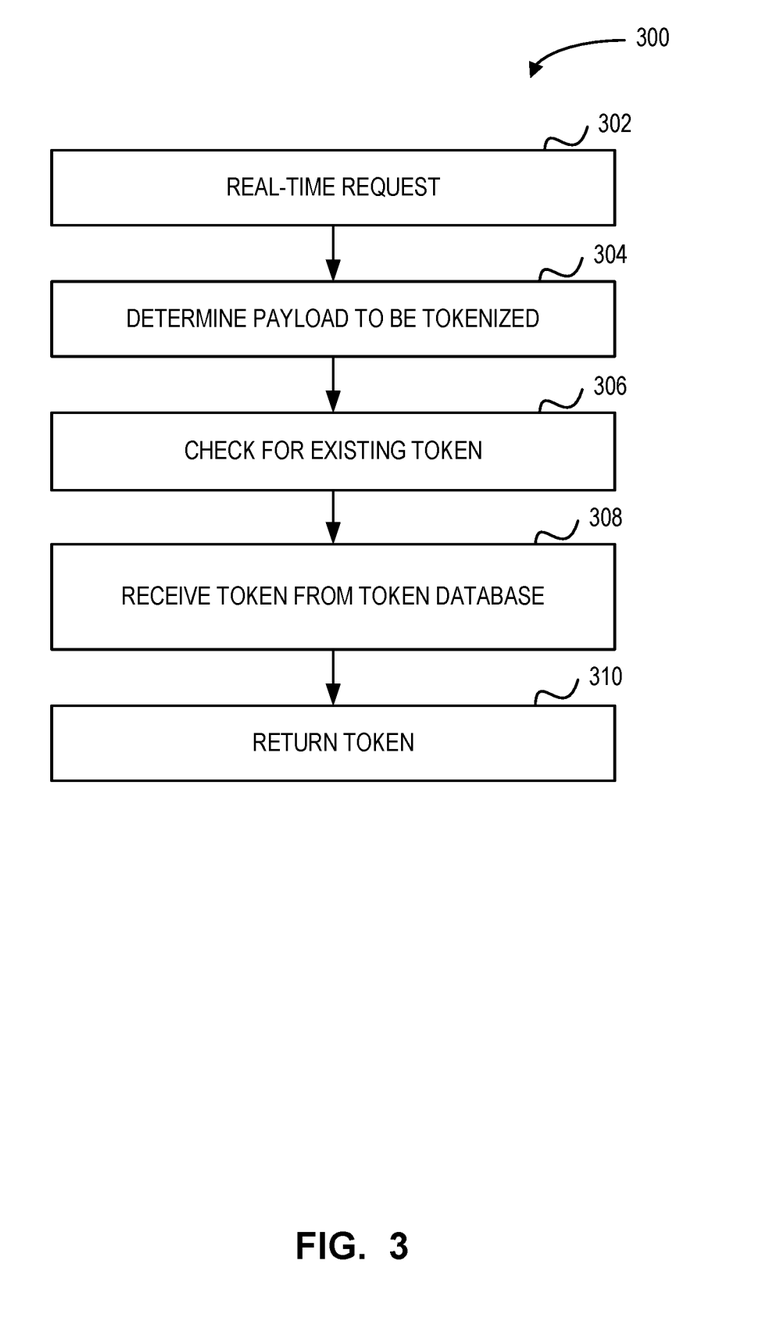
FIG. 3 is a flowchart diagram of an example method of tokenization.

Referring now to FIG. 3, there is illustrated a flowchart diagram of an example method for tokenization. The method 300 may be carried out, for example, by the real-time tokenization server 135 in system 100 of FIG. 1.

The method 300 begins at step 302 and the real-time tokenization server 135 receives a request to tokenize data in real-time from an on-premises or off-premises application or system such as the downstream application server 160. The request may include a source data 125 delta table comprising one or more payloads to be tokenized. Alternatively, the request may comprise structured data indicating the data to be tokenized and its tokenization parameters. The real-time tokenization server 135 may receive multiple requests in real-time to be processed concurrently. The real-time tokenization server 135 may receive the real-time requests via the network 110. In some cases, the real-time tokenization server 135 may receive the real-time requests from other systems, processes, and equipment directly.

At step 304, the real-time tokenization server 135 determines the payload to be tokenized. For example, the real-time tokenization server 135 analyses the source data 125 delta table to determine which elements require tokenization.

At step 306, the real-time tokenization server 135 determines if a corresponding token already exists in the real-time token database 136. If it does, the real-time tokenization server 135 retrieves the existing token. It will be noted that in some embodiments the real-time token database 136 contains only recently generated tokens, and thus may lack entries for all existing tokens in the larger token database 130. In some cases, this may result in duplicate tokens being generated, which can be added to the token database 130 during the synchronization process.

At step 308, if no existing token has been found, the real-time tokenization server 135 generates and stores new tokens in the real-time token database 136.

At step 310, the real-time tokenization server 135 returns the tokens newly generated by, and/or pre-existing in, the real-time token database 136 to the requesting system or application, such as the downstream application server 160.

Figure 4:
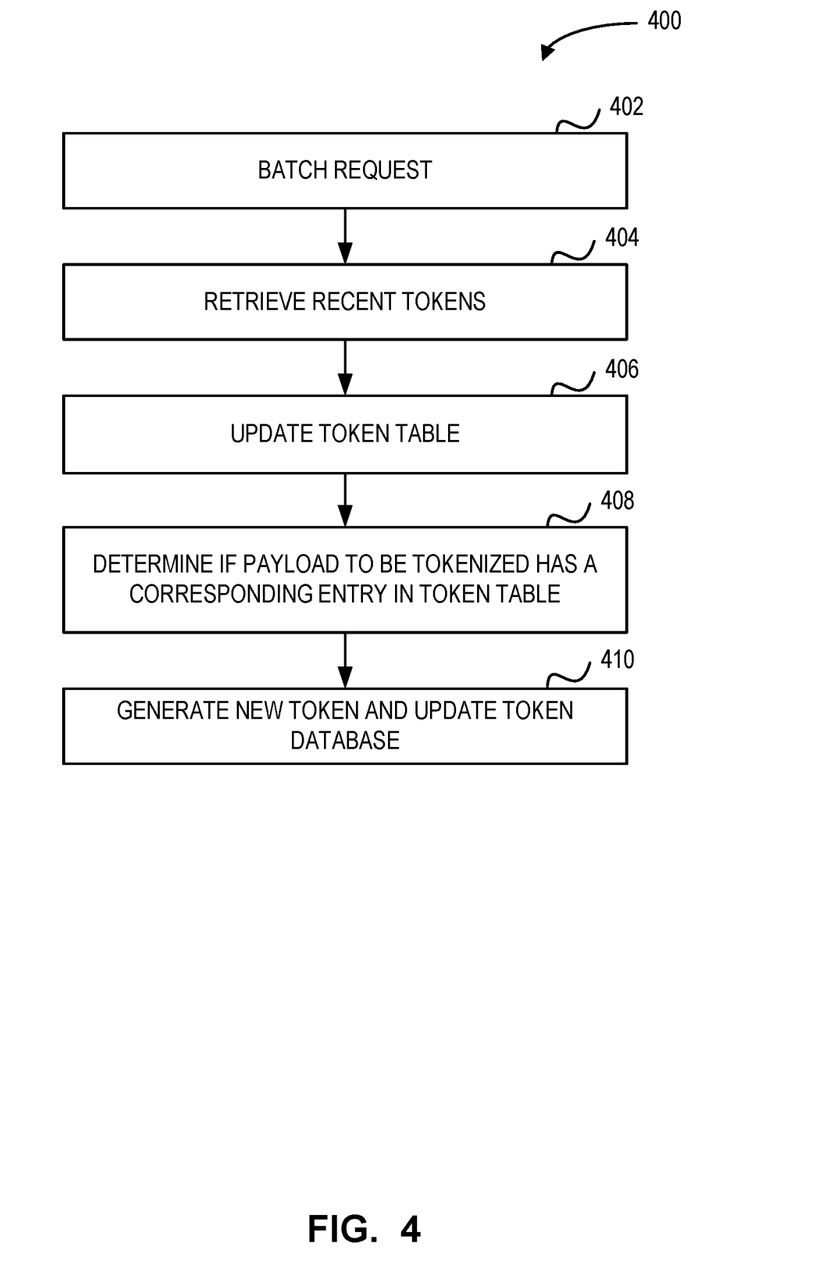
FIG. 4 is a flowchart diagram of another example method of tokenization.

Referring now to FIG. 4, there is illustrated a flowchart diagram of an example method for tokenization. The method 400 may be carried out, for example, by the batch tokenization server 140 in system 100 of FIG. 1.

The method 400 begins at step 402 and the batch tokenization server 140 receives or initiates a batch request, and receives corresponding data for tokenization, e.g., from the source database 120. The response may include a source data 125 delta table comprising one or more payloads to be tokenized. The batch tokenization server 140 may receive multiple batch request responses, each including source data 125 delta tables comprising one or more payloads to be tokenized, to be processed concurrently. The batch tokenization server 140 may receive the batch request responses via the network 110. In some cases, the batch tokenization server 140 may receive the batch request responses from other systems, processes, and equipment directly.

At step 404, the batch tokenization server 140 retrieves recent tokens from the real-time token database 136 and, if necessary, token database 130. The batch tokenization server 140 may retain a record of the previous retrieval of recent tokens (e.g., timestamp or index value), and therefore retrieve those tokens not previously retrieved.

At step 406, the batch tokenization server 140 updates the token table 155. The token table 155 contains tokens that have been previously retrieved and/or generated by the batch tokenization server 140. In order to update the token table 155, the batch tokenization server 140 compares the retrieved recent tokens with the token table 155. If any of the retrieved recent tokens are not found in the token table 155, the batch tokenization server 140 updates the token table 155.

At step 408, the batch tokenization server 140 determines if the one or more payloads to be tokenized has a corresponding entry in the token table 155. To determine this, the batch tokenization server 140 compares the one or more payload to the token table 155. If the one or more payload has a corresponding entry in the token table, the batch tokenization server 140 may proceed with tokenizing the payload and sending it to the downstream application server 160. If the one or more payload does not have a corresponding entry in the token table the method 400 proceeds to step 410.

At step 410, the batch tokenization server 140 generates a new token or tokens for the one or more payloads, and the token database 130 is updated with the new tokens and, if necessary, with any tokens retrieved from real-time token database 136 which have not yet been populated in token database 130. The batch tokenization server 140 may then proceed with de-risking the payload, i.e. generating tokenized data from the source data 125 included in the batch request to create a tokenized delta table, which is sent to the downstream application server 160. The tokenized delta table may be stored in a tokenized database.

The described system and methods generally provide for automatically determining if a token exists for a particular payload, generating new tokens if required, and maintaining a synchronized token database, avoiding the duplication of tokens. Off-premises systems, such as the downstream application server 160, may access the token database 130 via the network. As the token database 130 is updated as the new tokens are generated, the off-premises systems have access to the most recent updates.

Although the embodiment described herein shows only one downstream application server 160, the system 100 may include multiple downstream applications 160 performing a variety of different functions, any or all of which may require up to date information from the token database 130 when executing.

Although the embodiment described herein shows the source data 125 as hosted at the source database 120, the source data 125 may come from different processes, systems, and applications. Similarly, although only one token database 130 is shown, there may be more than one token database 130 within the system 100.

Although the embodiment described herein shows the token database 130 used by the real-time tokenization server 135 and the batch tokenization server 140 as a single database, such as Azure Cosmos DB, other arrangements are possible. In other embodiments the real-time tokenization server 135 may have a first token database and the batch tokenization server 140 may have a second token database, and the first and second token databases may be synchronized.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112a, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A tokenization system, the system comprising:
   a network;
   at least one token database coupled to the network;
   a real-time tokenization server coupled to the at least one token database via the network, the real-time tokenization server configured to:
   receive a request in real-time;
   in real-time, determine one or more payload to be tokenized and transmit one or more payload to the at least one token database for tokenization;
   the at least one token database configured to:
   tokenize the one or more payload to generate one or more tokens, and store an association between each of the one or more payload and respective one or more tokens along with a timestamp;

the real-time tokenization server further configured to:
receive at least one token from the at least one token database; and
return the at least one token in response to the request.

2. The tokenization system of claim 1, further comprising:
a batch tokenization server coupled to the at least one token database via the network, the batch tokenization server having a token table, the batch tokenization server configured to:
receive at least one batch request response comprising a delta table;
in response to each of the at least one batch request response, retrieve a plurality of recent tokens, based on a time of last update of the token table, from the at least one token database and update the token table with the plurality of recent tokens;
using the token table, determine a new payload from the one or more payload to be tokenized;
generate a new token corresponding to the new payload; and
update the token table and the at least one token database with the new token.

3. The tokenization system of claim 2, wherein the one or more payload is used a key.

4. The tokenization system of claim 2, wherein the one or more payload is preprocessed to generate a key.

5. The tokenization system of claim 4, wherein the one or more payload is truncated based on a set of predetermined rules and wherein the set of predetermined rules includes at least identifying a particular portion of the one or more payload to be used as the key.

6. The tokenization system of claim 1, wherein the real-time tokenization server is a microservice.

7. The tokenization system of claim 1, wherein the at least one token database includes a SQL database.

8. The tokenization system of claim 2, wherein the token table is stored in a local database of the batch tokenization server, the local database distinct from the at least one token database.

9. A method comprising:
receiving, by a real-time tokenization server, a request;
determining, in real-time by the real-time tokenization server, one or more payload to be tokenized;
transmitting, by the real-time tokenization server, the one or more payload to at least one token database for tokenization;
receiving, by the real-time tokenization server, at least one token from the at least one token database; and
returning, by the real-time tokenization server, the at least one token in response to the request.

10. The method of claim 9, wherein:
retrieving, in response to at least one batch request response, by a batch tokenizer server, a plurality of recent tokens, based on a time of last update of the token table, from the at least one token database and updates the token table with the plurality of recent tokens;
determining a new payload from the one or more payload to be tokenized, using the token table;
generating a new token corresponding to the new payload; and
updating the token table and the at least one token database with the new token.

11. The method of claim 10, further comprising using the one or more payload as a key.

12. The method of claim 10, further comprising preprocessing the one or more payload to generate a key.

13. The method of claim 12, further comprising truncating the one or more payload based on a set of predetermined rules and wherein the set of predetermined rules includes at least identifying a particular portion of the one or more payload to be used as the key.

14. The method of claim 9, wherein the real-time tokenization server is a microservice.

15. The method of claim 9, wherein the at least one token database is a SQL database.

16. The method of claim 10, wherein the token table is stored in a local database od the batch tokenization server, the local database distinct from the at least one token database.

17. A non-transitory computer readable medium storing computer executable instructions which, when executed by at least one computer processor, cause the at least one computer processor to carry out a method comprising:
receiving, by a real-time tokenization server, a request;
determining, in real-time by the real-time tokenization server, one or more payload to be tokenized;
transmitting, by the real-time tokenization server, the one or more payload to at least one token database for tokenization;
receiving, by the real-time tokenization server, at least one token from the at least one token database; and
returning, by the real-time tokenization server, the at least one token in response to the request.

\* \* \* \* \*